United States Patent

Longenecker

[15] 3,680,994
[45] Aug. 1, 1972

[54] QUICK CLEARING EXTRUDER AND ADJUSTABLE EXTRUDER DIE ASSEMBLY FOR FOODSTUFFS

[72] Inventor: John G. Longenecker, Ozone Park, N.Y.

[73] Assignee: Ael Food Automation Inc., Norwalk, Conn.

[22] Filed: Jan. 28, 1971

[21] Appl. No.: 110,456

[52] U.S. Cl..................107/14 C, 259/9, 259/25, 259/45, 259/97, 72/253, 18/12 SE, 18/30 SQ
[51] Int. Cl..............................................A21c 11/16
[58] Field of Search.........259/DIG. 32, 9, 10, 97, 25, 259/45; 107/14 R, 14 C, 14 CA; 17/35–40; 25/8, 11, 14, 15, 17; 31/8, 13, 14; 100/145; 72/253, 254, 262, 272; 18/12 SM, 12 SE, 12 SR, 30 SM, 30 SQ, 13 R, 14 R

[56] References Cited

UNITED STATES PATENTS

| | | | |
|---|---|---|---|
| 2,302,169 | 11/1942 | Baker | 259/DIG. 32 |
| 2,583,600 | 1/1952 | Schreiber | 107/14 C |
| 3,561,371 | 2/1971 | Kummer | 107/14 R |
| 3,613,603 | 10/1971 | Reisman | 107/14 C |

*Primary Examiner*—Jordan Franklin
*Assistant Examiner*—Geo. V. Larkin
*Attorney*—Bryan, Parmelee, Johnson & Bollinger

[57] ABSTRACT

Foodstuff extrusion apparatus in which the extruder has a split-half housing secured together by hand releasable clamps and a bayonet locked end plate cover removable by turning a disassembly handle so that access to the extruder interior may be rapidly obtained. The extruder screw is removably attached to the power shaft and may be axially withdrawn for cleaning. The extrusion apparatus also features an adjustable die in cooperation with a rotary cutter which defines an orifice, the size of which may be finely controlled by means of a hand operated releasably locking vernier. The vernier is released so that the adjustable die may be quickly opened widely to permit passage of clogging material and then returned to its preadjustable position. The adjustable die is rapidly detachable from the extruder outlet by hand release of a clamp permitting the die to be removed for cleaning or replacement. The extruder and its associated features are so designed and constructed that disassembly and access to the interior, fine and gross adjustment of the orifice and detachment of the die may all be accomplished by an operator without the need for special tools or training and without undue interruption of the extrusion cycle.

12 Claims, 13 Drawing Figures

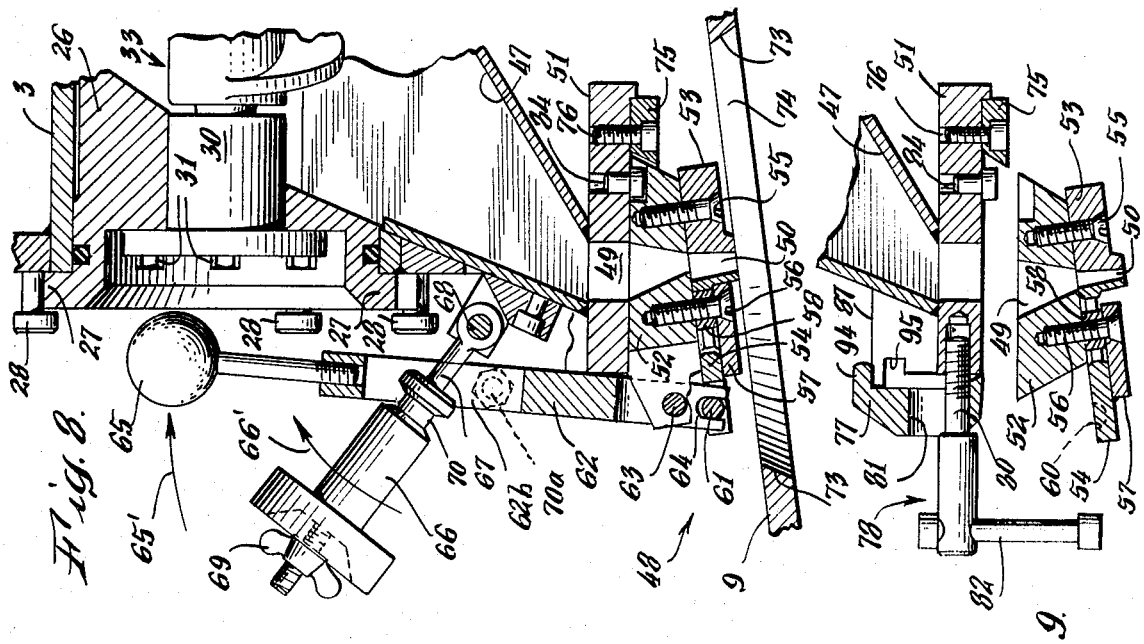
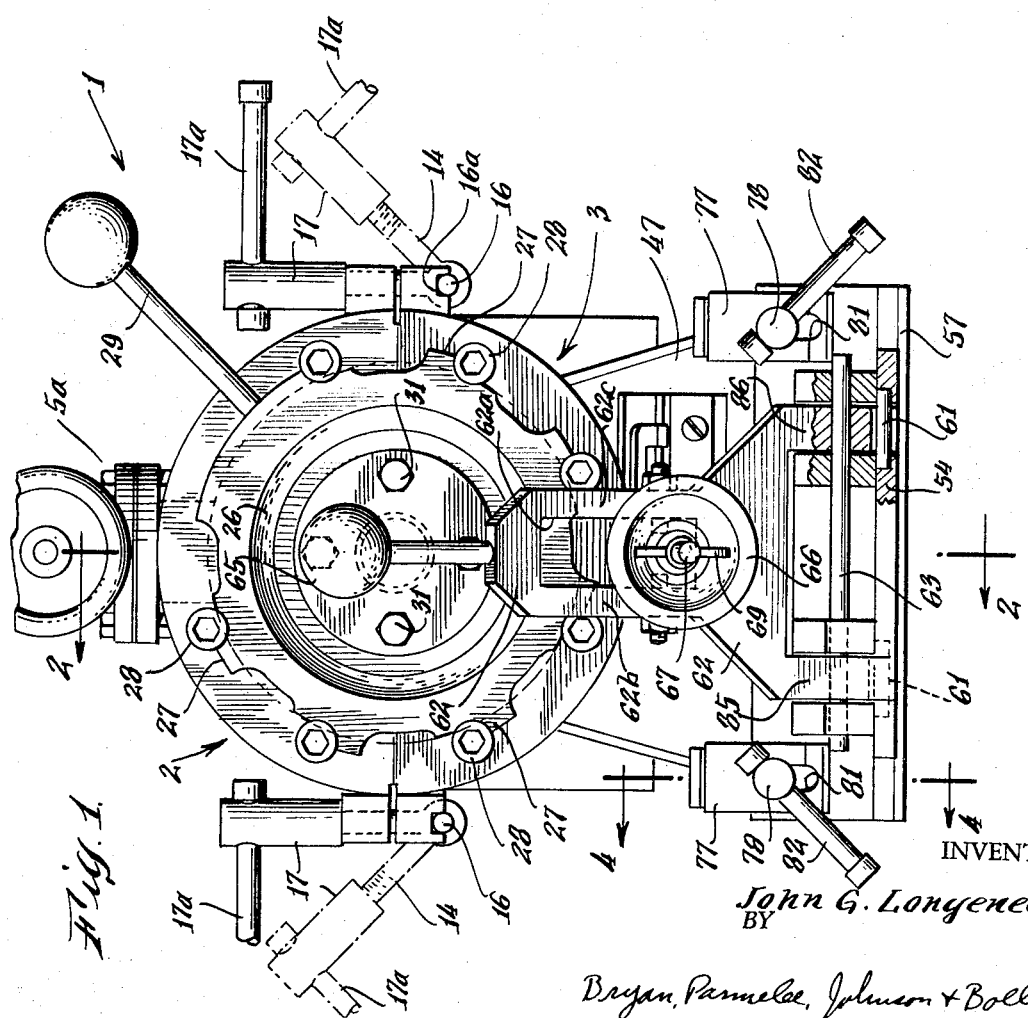

INVENTOR.
John G. Longenecker

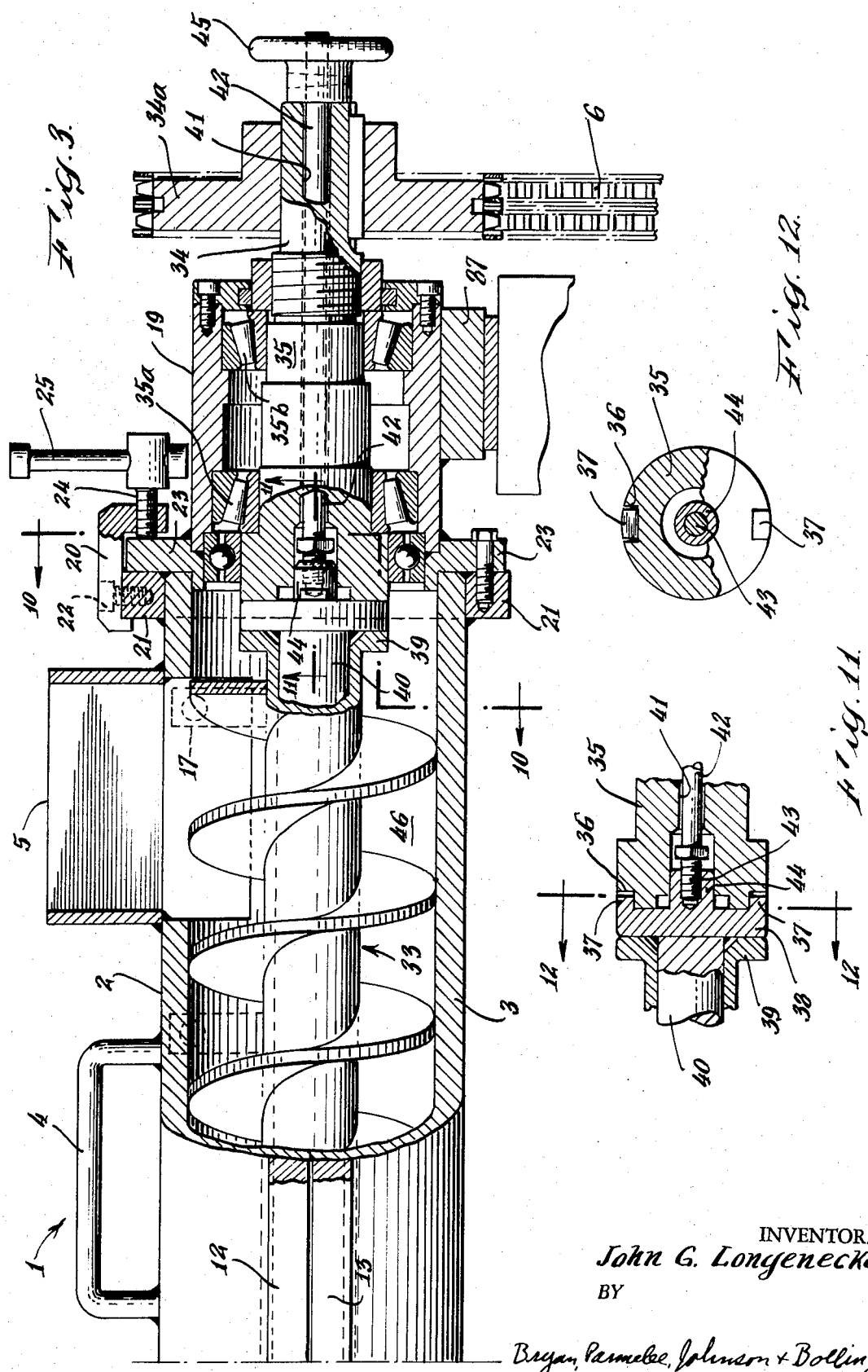

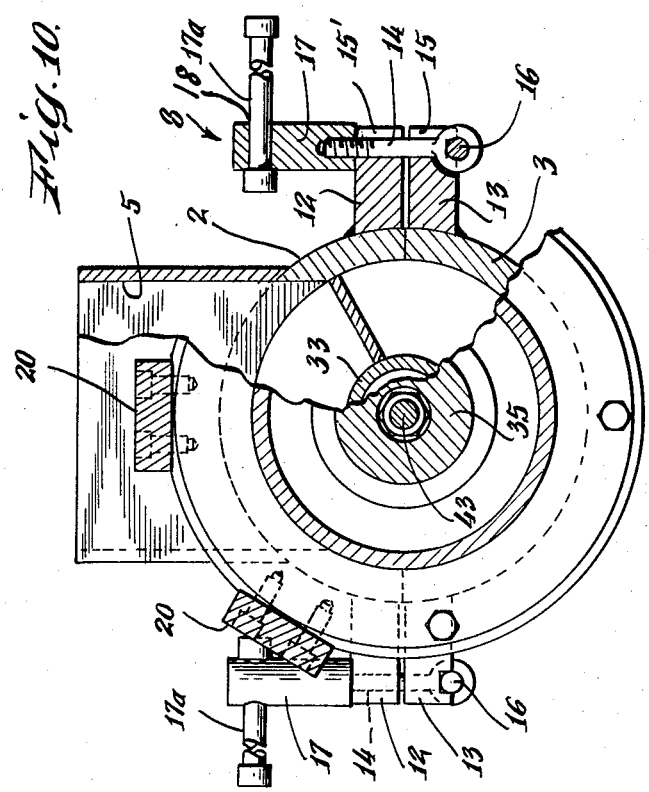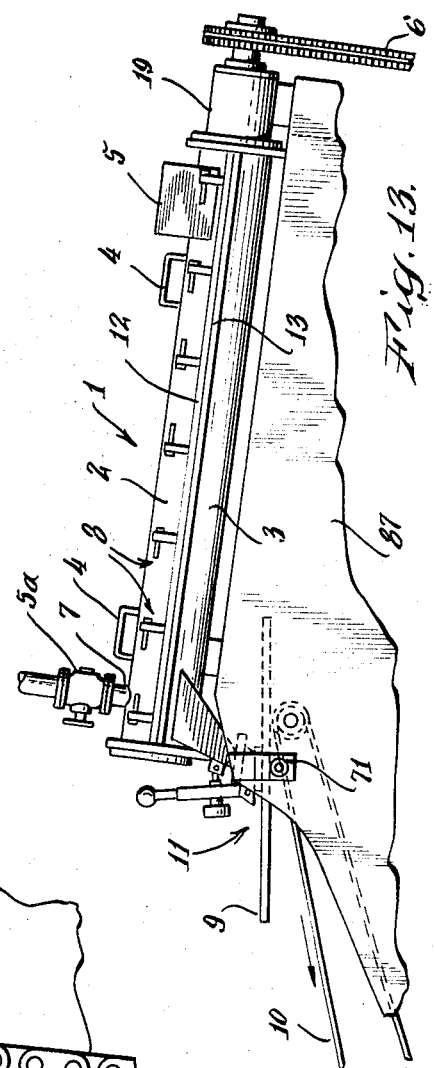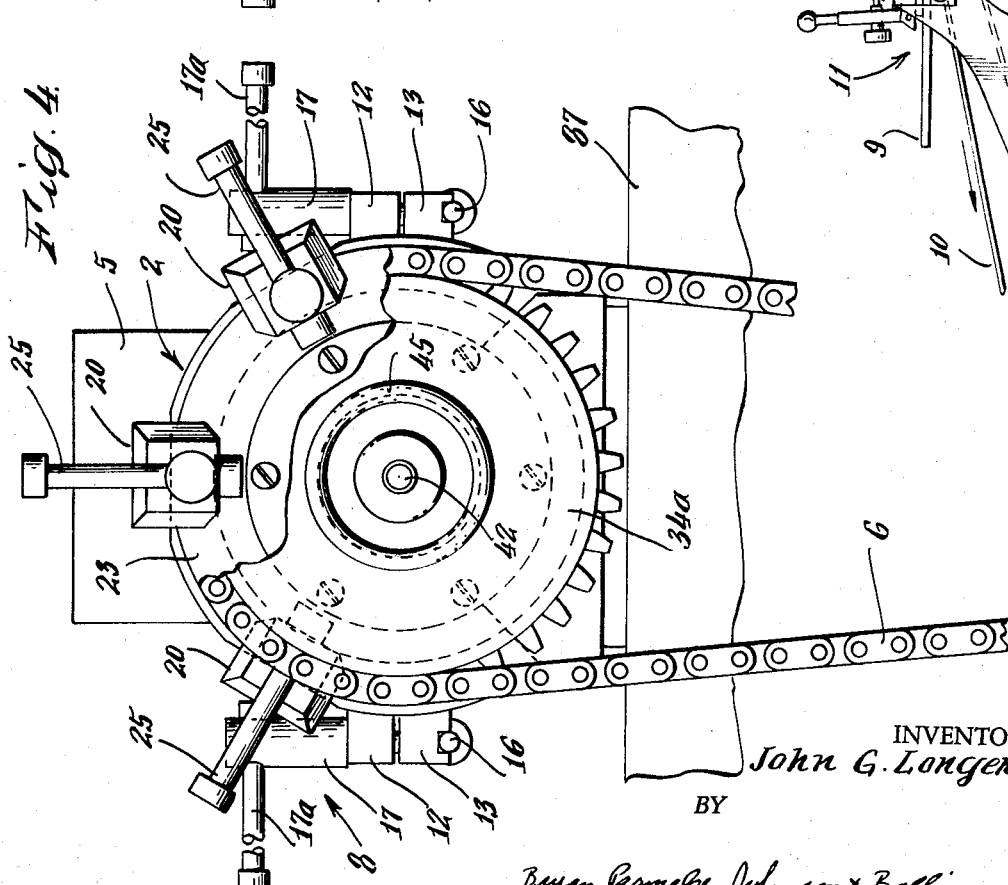

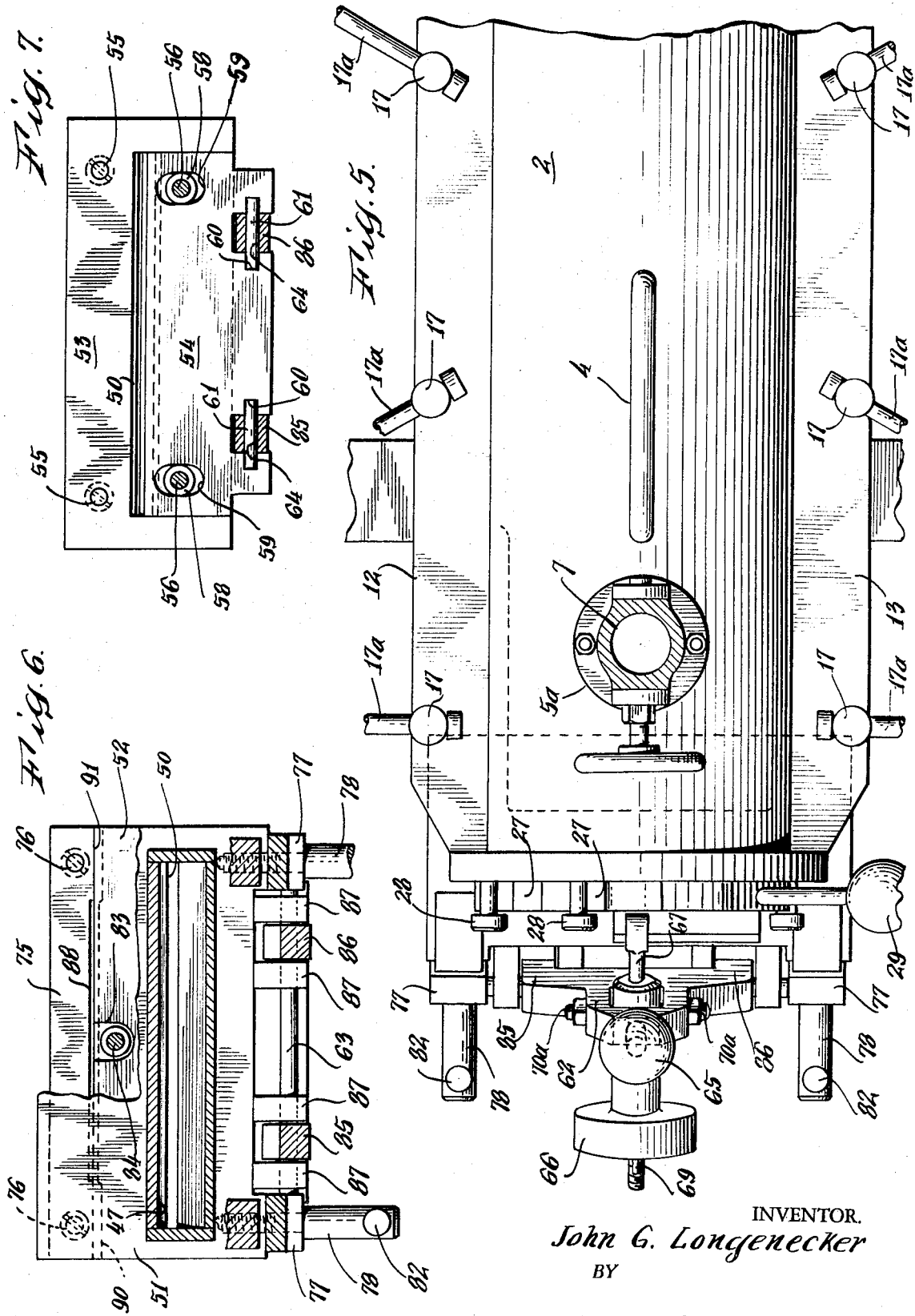

QUICK CLEARING EXTRUDER AND ADJUSTABLE EXTRUDER DIE ASSEMBLY FOR FOODSTUFFS

DESCRIPTION

This invention relates to the extrusion of foodstuff material and more particularly to an extruder and adjustable extruder die assembly that permits relatively quick and effortless access to the extrusion apparatus interior to correct upsets due to foodstuff processing problems, e.g., apparatus jamming caused by unexpected lumps present in the material being extruded.

In the extrusion of foodstuffs, and like perishables, the material that is being extruded often lacks true homogenity due to variations in mixing of components or variations in granular size or other causes and also its consistency in the extruding apparatus cannot be relied upon to be uniform at all times. One such example of this is the "lumping" of pastry or other dough which is being extruded into specific shapes to produce the end product desired, such as pizza rounds or tortillas. The irregularity in the material being extruded, such as the aforementioned lumping, contributes to and is a frequent cause of jamming of prior art extruding apparatus. The jamming may occur either within the extruder itself or at its outlet, i.e., at the die. The presence of lumps in the material, even if not severe enough to jam the extruder apparatus, may result in extrusion of a product that fails to meet requirements as to size, shape and uniformity. For example, when part of the die orifice has become clogged by an unexpected lump, the foodstuff blanks being extruded become lopsided and are commercially unacceptable. Thus, a large quantity of foodstuff may be wasted unless the die is cleared quickly.

Several undesirable effects in the prior art equipment are associated with jamming of the extrusion apparatus. The time required to clear the extrusion apparatus of any jammed material results in interruption of the continuous extrusion cycle with considerable expense due to wastage of foodstuff and "downtime" of equipment. Additionally, such interruption results in decrease in production output with the risk of lost sales due to failure to meet output commitments. With perishable materials, time is similarly of consequence. If the extruded product fails to meet appearance requirements because of irregularities caused by material obstructions, the product must either be thrown away or recompounded for another pass through the extrusion apparatus. Both of these procedures result in waste and consequent loss of money.

Once material has jammed the prior art extrusion apparatus, it must be laboriously dismantled so that it may be cleared of lumps and restarted. Such disassembly of prior art equipment requires, in addition to the expense of downtime, the use of personnel and appropriate tools, e.g., specially trained and suited to disassembly of such type of food machinery.

The present invention overcomes all the above drawbacks previously associated with apparatus for the extrusion of foodstuffs. In particular, the present invention provides an apparatus which greatly facilitates the clearing of jammed material in addition to preventing, to a large extent, such jamming, with the result that waste and downtime costs are reduced to a minimum. In addition, this clearing is accomplished without the need of special training or tools to work on the foodstuff extrusion apparatus.

It is an object, therefore, of this invention to provide a foodstuff extruder apparatus which can be relatively quickly and effortlessly cleared of lumped or otherwise undesirable extruding material without the use of special tools or training.

It is a further object of this invention to provide an adjustable extruder die assembly for the extruder, which die can be quickly and effortlessly varied in gross adjustment so as to permit passage of lumped extruding material and which die also may be quickly and effortlessly removed from the extruder outlet to permit access thereto for clearing of jammed extruding material, such adjustment and removal being accomplished without the need for special tools or training.

The invention, therefore, reduces the downtime experienced during the extrusion of foodstuff material by preventing jamming of material in the die and by permitting ready access to the extruder interior to unclog any lumped material. The apparatus according to this invention enables the extrusion process to be essentially continuous and reduces significantly waste of extruding material. Both of the above result in considerable cost savings. Moreover, the apparatus of this invention permits the above to be done without the use of special tools, in fact without the use of any tools or special training. An operator of the extruder is enabled to perform the unclogging and clear-out procedure quickly, conveniently and entirely manually.

In one of its aspects the invention includes an extruder having a barrel housing which encases the extruder screw. The housing is split longitudinally so that one half may be removed to permit ready access to the barrel chamber and screw for cleaning thereof. Additionally, the housing end has a cover which may be removed in order to withdraw the extruder screw longitudinally from the housing.

In another of its aspects the invention includes a die assembly which is adjustable so that the shape of the product extruded may be varied as desired. The die defines an opening, the extruder orifice, which may be freed of jammed material by movement of a lever which quickly adjusts the die to its most open position to permit passage of the material.

A further feature of the invention concerns the manner in which the adjustable die assembly is held to the extruder outlet. The entire die assembly is retained adjacent the extruder outlet by use of manually operable clamping means so that a simple movement of the clamping means permits the assembly to be removed.

The various aspects, features and advantages of the foodstuff extrusion apparatus of the present invention will be more fully understood from a consideration of the following detailed description in conjunction with the accompanying drawings, in which:

FIG. 1 is a front elevational view of a foodstuff extrusion apparatus according to the present invention;

FIG. 3 is a side elevational sectional view of the rear portion of the extrusion apparatus showing the screw secured to a power shaft;

FIG. 4 is a rear elevational view of the extrusion apparatus showing a manner of power drive;

FIG. 5 is a top view of the front portion of the extrusion apparatus;

FIG. 6 is a sectional view taken along line 6—6 of FIG. 2 showing the extruder outlet and orifice;

FIG. 7 is a sectional view taken along line 7—7 of FIG. 2 and showing the adjustable extrusion orifice defined by the die assembly;

FIG. 8 is a sectional view similar to FIG. 2 but highlighting the extruder die assembly;

FIG. 9 is a detailed sectional view illustrating the manner in which the adjustable die assembly is secured to the extruder outlet;

FIG. 10 is a split sectional view taken along line 10—10 of FIG. 3 showing the manner in which the extruder housing is held together;

FIG. 11 is a detailed sectional view showing the extruder screw shaft as joined to the power shaft;

FIG. 12 is a sectional view taken along line 12—12 of FIG. 11 and showing a key and slot arrangement in detail; and FIG. 13 is a side elevational view of the entire extrusion apparatus showing its inclination to the horizontal (taken as the drawing edge).

Figure 2:
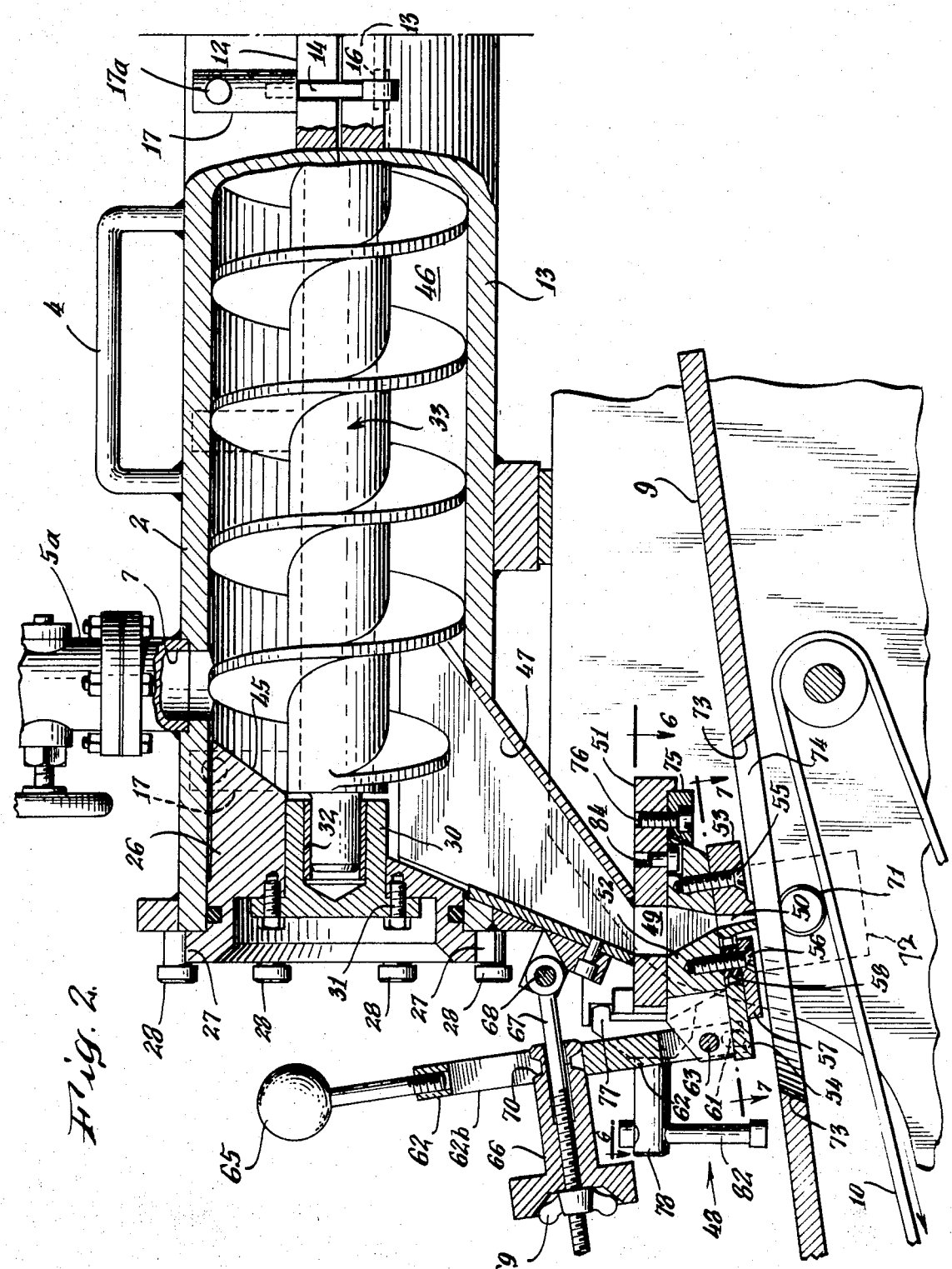
FIG. 2 is a side elevational sectional view of the front or outlet portion of the extrusion apparatus taken along line 2—2 of FIG. 1 and showing the extruded material cut-off means and a belt for conveying the product away.

Referring to FIG. 13 of the drawings in greater detail, there is shown a preferred embodiment of foodstuff extrusion apparatus according to this invention, having an upper barrel housing 2 and a lower barrel housing 3. The upper and lower housings are secured together by a series of manually operable clamping dogs indicated generally at 8. The upper barrel housing is provided with lifting handles 4 which facilitate separation of the upper housing 2 from the lower housing. At the upstream end of the upper housing 2 is located a food material inlet 5 which constitutes a feed box into which the material to be extruded e.g., tortilla dough is introduced. Also at the upstream end can be seen a driving sprocket belt 6 which transmits power from a drive mechanism, such as an electric motor (not shown) to a power input shaft (See also FIG. 3) which drives the extruder screw.

Situated at the downstream end of the upper extruder housing is bypass outlet 7 (FIG. 13) through which dough may exit should it be necessary because of blockage in the machine or for other purposes, e.g., cleaning. During normal operation this bypass outlet is kept closed by means of valve 5a. Also shown in FIG. 13 is rotary cutter disk 9 which functions to shape and sever the extruded dough to form foodstuff article blanks, e.g., thin disks of dough for making tortillas, pancakes, pizza rounds, and the like. Below the cutter disk is a conveyor belt 10 for the product blanks which have been formed.

In operation, material to be extruded, e.g., tortilla pastry indredients, is introduced into the feed box 5 whence it passes through the extruder housing 1 by action of a screw (FIGS. 2 and 3). The dough is expressed at the extruder outlet end, indicated generally at 11. The extruded dough is shaped and severed by the rotary cutter disk 9 to produce a predetermined size of article blanks which are conveyed away from the extrusion apparatus by conveyor belt 10.

FIGS. 1 and 10 show the manner in which upper housing barrel 2 and lower housing barrel 3 are quickly and conveniently manually disconnected by the manually operable clamping dogs 8. As is best seen in FIG. 10, the upper and lower housings are each comprised of a semi-cylinder having protruding mating flanges 12 and 13 respectively, welded thereto. The lower housing flange 13 has several clearance notches 15 in which are located threaded eye bolts 14 which are pivotally mounted on a retainer pin 16. The retainer pin 16 passes through the eye of each bolt on one whole side so that the eye bolts 14 of the clamping dogs 8 are hinged about the retainer pin. The upper housing flange 12 contains notches 15' complementary to those in lower flange 13 for receiving the shanks of the bolts 14 when these bolts are in their clamping position. The upper housing is clamped tightly to the lower housing by means of internally threaded collars 17 which screw onto the eye bolts 14 and form a housing clamp dog 8. The collars may be screwed onto the eye bolt easily by hand, turning them through the use of a handle 17a inserted through hole 18 drilled through collar 16 normal to its longitudinal axis.

The manner in which eye bolt 14 and associated collar 17 hinge about the retainer pin 14 shown in FIG. 1. The eye bolt and collar constituting the housing clamp are shown in their securing or fastening positions by solid lines. Also shown, by dotted lines, is the unfastened position of the bolt and collar wherein the two are hinged about the retainer pin and swung out of the upper housing flange cut-out 15'. The upper housing 2 is then no longer restrained and may be readily lifted from contact with the lower housing 3 to permit access to the extruder interior.

The retainer hinge pin 16 extends along within a groove 16a (FIG. 1 and 4) beneath the lower flange 13. The depth of this groove is slightly greater than the radius of the pin 16, and the pin is held in place by "staking" the wall of the groove. Thus, a single long pin 16 on each side serves as the hinge pin for all of the clamp dogs 14, 17 on that side.

With reference to FIG. 3, the upper housing 2 is additionally detachably secured to a thrust block 19 at a point upstream of the feed box 5 by means of a series of C-shaped clamps 20. These clamps 20 are fastened to a circumferential flange 21 on the upper housing by machine screws 22 and are held fast to a complementary circumferential flange 23 on the thrust block by a clamp screw 24 which may be conveniently turned by handle 25. Prior to separating the upper and lower housings these clamp dogs 20 must also be loosened.

Access to the extruder interior may also be obtained through the downstream end by removal of the end plug assembly 26 shown in FIG. 2. The end plug assembly 26 has a circular bayonet flange 27 (See also FIGS. 1 and 5) which secures the assembly to the extruder housing by means of retaining studs 28. Secured to the bayonet flange is a disassembly handle 29, movement of which rotates the plug assembly 26 to disengage the bayonet flange 27 from beneath the studs to permit removal of the entire end plug assembly.

As shown in FIG. 2, the end plug assembly 26 has a dough deflector surface 45 nested in which is a bearing block 30. This bearing block 30 is secured to the end plug assembly 26 by means of bolts 31 and provides a suitable support for the annular outboard bearing 32 of the extruder screw, indicated generally as 33 in FIG. 2. Thus, upon removal of the end plug assembly 26, the extruder screw 33 which is releasably secured to the power shaft at its upstream end may be withdrawn axially from the housing barrel chamber.

The manner in which the extruder screw 33 is releasably secured to this power input shaft is shown most clearly in FIGS. 3, 11 and 12. In FIG. 3 is seen the power input shaft 34 having a spindle 35 journalled in bearings 35a and 35b in the thrust block 19. Spindle 35 has recess slots at 36 (FIG. 11) which receive dogs 37 of a clutch drive plate 38 which is fixedly secured to flange 39 of shaft 40 of the extruder screw 33. When the spindle end surface and drive plate end surface are in contact, dogs 37 protrude into slots 36 thus providing a positive drive clutch engagement such that rotation of the spindle 35 will cause rotation of drive plate 38 and hence of the screw 33.

Spindle 35 contains a bore 41 through which passes a retaining rod 42 for retaining the clutch means 36, 37 engaged. Rod 42 is threaded at 43 and screws into a pilot boss 44 of the clutch drive plate 38 thus drawing the tapered pilot 44 into a socket aligned with the bore 41 of the spindle 35 causing spindle 35 and drive plate 38 to come into surface contact. The retaining rod 42 is screwed up tightly by means of a hand know 45 (FIG. 3) secured to its outer end.

In operation, rotation is imparted to the drive shaft 34 by pulley 34a driven by the link belt 6. Rotation of shaft 34 and associated spindle 35 causes the extruder screw 33 to be turned through the dog and slot engagement of spindle 35 and drive plate 38. The drive plate 38 may be disengaged from spindle 35 by manually turning knob 45 to unscrew the retaining rod 42 from the pilot boss 44. The extruder screw may then be withdrawn axially from the housing chamber through the downstream end.

The quick-clearing adjustable orifice feature of the invention is illustrated in FIGS. 2 and 8. Leading from the extruder barrel chamber 46 is an outlet throat passage 47 communicating with an adjustable die assembly 48 to define a transition with a nozzle portion 49 ending in extruder orifice 50. Outlet throat passage 47 has a peripheral mounting base plate 51 to which is held the adjustable die assembly 48.

The die assembly 48 includes an angular adaptor block 52 to which are secured die plates 53 and 54. The die plate 53 is fixedly held by machine screws such as shown at 55, while the die plate 54 is movably held by means of machine screws 56 (See also FIG. 7) 56 passing through a plate 57 and stand-off bushings 58. The die plate 54 is permitted to move parallel to the adaptor block surface due to provision of adjustment slots 59 (FIG. 7).

In order to move the die plate 54 toward or away from the fixed die plate 53 for adjusting the size of the orifice 50, a convenient manual lever control mechanism is provided. As can be seen in FIGS. 2 and 8, the movable die plate 54 extends beyond the side wall of the adaptor block 52 and is grooved at points 60 (FIG. 7) to receive a pair of adjustment lever hinge pins 61. Also shown is a manual adjustment lever 62 which is pivoted on a fixed pivot at 63 and is connected to the die plate 54 by inserting retractable hinge pins 61 extending through a clevis slot 64 at the lower end of the adjustment lever 62. This adjustment lever 62 has a handle 65, movement of which will result in motion being imparted to adjustment lever 62 and thus through the hinge pins 61 to the die plate 54 so that the orifice opening defined by plates 53 and 54 may be varied.

In FIG. 2 the handle 65 is shown in its normal operating position; whereas, in FIG. 8 the handle 65 has been swung to the right, as indicated by the arrow 65'. The result is to open up the orifice 50 as shown in FIG. 8.

Very accurately controllable positioning may be imparted to the lever 62 to effect precise adjustment of the die plate 54 by releasably locking vernier adjustment means 66 which can be adjusted along an adjustment screw 67. This adjustment screw 67 is hingedly mounted on the extruder frame by a retractable pivot pin 68. The vernier adjustment means 66 cooperates with the adjustment lever 62 in a releasable locking relationship provided by a peripheral groove 70 in the vernier 66 adapted to be engaged by a pair of inwardly protruding studs 70a (FIG. 8) so that the vernier means 66 engages with and controls the lever, and adjustment of the former will be imparted to the latter. To insure that the vernier 66 is held fixed once adjusted, a restraining lock nut 69 is provided.

In operation, vernier means 66 is turned by hand to be moved along the adjustment screw 67. Its movement is imparted to lever 62 through the tongue and grove co-operative engagement at 70a and 70. The lever's movement in turn is transmitted to the die plate 54 with the result that the orifice size can be varied and adjusted to extremely close tolerance.

In FIG. 8 is shown the manner in which vernier means 66 may be disengaged from its tongue and grove interlocking relationship with the lever 62. The vernier means is swung upwardly as indicated by the arrow 66' causing adjustment screw 67 to pivot about its hinge pin 68. Once the vernier means are thus free from engagement with the studs 70a, the lever 62 is no longer restrained from movement, and the adjustable die plate 54 may be readily moved by the handle 65 to vary the orifice size.

As shown in FIG. 1, the lever 62 has an elongated opening 62a, and the shank of the vernier screw member 66 extends through this opening. The studs 70a project inwardly from the legs 62b and 62c on opposite sides of the opening 62a.

By virtue of this vernier means 66, the orifice size may be finely adjusted without using tools by manually turning the vernier. Alternatively, whenever desired, vernier means 66 may be quickly flipped up and the lever 62 operated to rapidly provide gross adjustment of orifice 50. The orifice 50 can be quickly returned to the fine adjustment previously made since vernier means 66 retains the adjusted position. In this manner any clogging material may be made to pass through the orifice by quickly opening it, and then it can immediately be returned to the precisely adjusted size required to produce the product blanks of desired characteristics.

FIG. 7 shows a sectional view of the die plates 53 and 54 and orifice 50 defined thereby, taken on line 7—7 of FIG. 2. The adjustability of die plate 54 can be seen. As mentioned above, movement is permitted by slots 59 to vary the size of orifice 50.

Referring to FIG. 2 again, there can be seen immediately beneath, i.e., downstream of the adjustable die assembly 48, the rotary cutter disc 9. The cutter disk 9 is supported at spaced apart circumferential points on its periphery by support bearings or rollers 71 which are contained in a bracket 72 secured to the extruder housing. Drive means (not shown) rotate this cutter disc 9 thus causing the disc to rotate with the desired speed. The rotary cutter disc has an opening 74 with beveled edges 73 for cutting and shaping the extruded material. As the cutter passes beneath the die and orifice the material being extruded through the orifice 50, is cut and shaped by the opening 74 with its beveled edges so that the resultant dough product blank that passes to conveyor belt 10, such as a tortilla blank, is in a substantially circular shape.

The support bearing roller 71 serves to support the cutter disc 9 against deflection due to the pressure of the dough in the extruder orifice 50. The bearing 71 is adjustably mounted by the bracket 72, so that the bearing roller 71 can be dropped down to a lower position to permit the disc 9 to be dropped down away from the die assembly 48 for cleaning or servicing and also to permit removal of the die assembly 48, as explained below.

The entire adjustable extruder die assembly 48 is readily removable from the mounting plate 51, as shown best in FIGS. 2 and 9. Referring to FIG. 2, the die assembly is held fast to plate 51 by means of the dovetail engagement, at one side of the angular adapter block, with an angular retaining block 75 having an open angle A less than 90° measure relation to the plate 51. This retainer 75 is fastened to plate 51 by machine screws 76.

The angular adapter block is held along its other edges by means of a similar complementary dovetail angular relationship with a die retaining clamp 77. This die retaining clamp 77 is secured to the plate 51 by a clamp screw 78. To insure that the die assembly 48 is secured against longitudinal movement, a locator pin 84 (See also FIG. 6) on the plate 51 fits into a notch 83 of the angular adapter block 52.

The clamp dog 78 screws onto a stud 80 (FIG. 9), so that clamp 77 is free to move when the clamp dog member 78 is unscrewed. A handle 82 permits easy turning of the screw dog 78 without the use of tools. When the die retaining clamp dog 78 is unscrewed partially from its stud in the edge of plate 51, as shown in FIG. 9, the heel of the clamp 77 can be disengaged from the socket 95 in the frame allowing the clamp 77 to be moved upward to disengage the dovetail surface of adapter block 52. The die retaining clamp 77 is movable, as shown in FIG. 9, up to a retracted position where the heel of the clamp 77 can engage frame protrusion 94 retaining the clamp 77 in this position, so that its bottom extremity does not protrude beyond the surface of plate 51. In this manner, the die assembly 48 may be withdrawn along a path immediately adjacent to and parallel to the surface of plate 51. That this results in substantial convenience and saving of time can be seen from FIG. 2. There the close proximity of rotating cutter disc 9 to the die assembly, as well as the angle of convergence between the plane of flange 51 and cutter disc 9, is shown. Removal of the die assembly adjacent and parallel to the flange 51 obviates the necessity for removing the cutter disc 9. However, the cutter disc 9 can be quickly moved down to provide more clearance, as discussed above.

It will be understood that the extruder herein with removable adjustable die assembly 48 is particularly suitable for the extrusion of foodstuffs and like perishable or changeable materials since upsets such as jamming due to lumping of material may be readily corrected by access to the apparatus interior or adjustment of the orifice opening. As shown and described, the above operation may be performed by the operator of the machine by hand without the need for special tools or training.

It is noted that there is a delicate balance between the extruder action and the orifice size 50 relative to the motion of the cutter disc 9. If the orifice size is too large or too small, the extruded product blank will be improperly formed or shaped. Therefore, the retention of the appropriate vernier adjustment is important to producing food product blanks, such as tortilla blanks, having the desired characteristics.

To provide accurate adjustment and positioning of both ends of the movable die plate 54, the lower portion of the lever 62 is bifurcated into two legs 85 and 86. (FIGS. 1 and 5) These legs are each pivoted on the fixed pivot 63, as seen in FIG. 1. The pivot 63 passes through fixed frame members 87 (FIG. 6) which straddle the respective legs 85 and 86 to provide rigid support for the pivot 63. It is the clevis slots 64 in the lower ends of these legs 85 and 86 which engage the respective hinge pins 61 (as seen most clearly in FIG. 7). These pins 61 are located near opposite ends of the movable plate 54 for accurately controling both ends thereof to provide a uniform width of the elongated orifice slot 50.

Moreover, to facilitate removal of the adjustable die mechanism 48, as discussed above, the hinge pins 61 can be removed from the grooves 60 and can be removed from the clevis slots 64.

Also, to provide precise positioning of the nozzle portion 49, the dovetail engaging surface near A (FIG. 9) of the retainer 75 is machined off in its central portion 88 (FIG. 6) to create two spaced dovetail-engaging faces 90 and 91. Thus, the adaptor block 52 is accurately positioned at each end thereof.

With reference to FIG. 9, when the C-shaped clamp member 77 is retracted it hooks over a ledge 94 on the frame 87. When in its clamping position, the upper end of the clamp 77 engages in locator socket 95 to provide accurate positioning of the clamp and hence accurate positioning of the adaptor block 52.

What Is claimed is:

1. Quick-clearing foodstuff blank extruder forming apparatus for forming foodstuff product blanks, such as blanks of dough for tortillas, pancakes, pie crusts and blanks of extrudable foodstuff material for making other food products, comprising:
an extruder barrel defining an extrusion chamber with extruder screw means extending longitudinally in said chamber,
said extruder barrel being formed by upper and lower semi-cylindrical housings having mating flanges,
a plurality of manually releasable clamps for releasably clamping said upper housing to said lower housing for providing ready access to the extrusion chamber and to the extruder screw means for cleaning out the foodstuff material therein, power input means at the upstream end of said extruder barrel for rotating said extruder screw, manually detachable clutch means coupling said power input means to said extruder screw, a removable end plug assembly at the downstream end of said extruder barrel, said removable end plug assembly carrying an outboard bearing for said extruder screw, manually releasable fastening means holding said removable end plug assembly in position at the downstream end of said extruder barrel for providing removal of said end plug assembly together with said outboard bearing to thereby permit removal of said extruder screw means through the downstream end of said extruder barrel upon detachment of said clutch means, said extruded barrel having outlet throat means at the downstream end defining an outlet throat passage communicating with said extrusion chamber, nozzle means at the outlet end of said outlet throat passage including opposed die means defining an extruder orifice, a rotary cutter disk adjacent to said extruder orifice for shaping and cutting the foodstuff material being extruded therethrough to form food product blanks, adjustment means for adjusting the spacing between said opposed die means for varying the size of said orifice to very the thickness of said food blanks, and said adjustment means being adapted to quickly open said orifice for quickly clearing clogging lumps of foodstuff from said orifice.

2. Quick-clearing foodstuff blank extruder forming apparatus as claimed in claim 1, in which:

vernier means are provided for controlling said adjustment means, and releasable engaging means for releasably engaging said vernier means with said adjustment means for providing fine adjustment of said extruder orifice by use of said vernier means, and when said releasable engaging means is disengaged from said adjustment means, allowing quick opening of said extruder orifice by said adjustment means for quickly clearing the orifice, and said releasable engaging means being re-engagable with said adjustment means upon the return of said adjustment means to the same position as previously adjusted by said vernier means.

3. Quick-clearing foodstuff blank extruder forming apparatus as claimed in claim 1, in which:

said opposed die means includes a fixed die plate included in said nozzle means, a slidable die plate opposed to said fixed die plate defining an orifice slot between said two die plates, said nozzle means being manually detachable from said outlet throat means, said adjustment means including a manually adjustable lever pivotally connected with said slidable die plate, and said lever being manually disconnectable from said adjustable die plate.

4. Extrusion apparatus for extruding foodstuff material and that facilitates the clearing of jammed material comprising orifice nozzle apparatus with a cooperating cut-off member for cutting off the extruded material, said nozzle assembly including an adjustable die assembly comprising:

a die block having a nozzle opening therein, at least one die plate movably mounted on said die block, said die plate defining together with a complementary element on said die block an extrusion orifice which communicates with the nozzle opening in the die block to form an extrusion orifice located at the output end of said nozzle assembly, said die plate being adjustably movable for adjusting the size of the orifice, adjustment means connected to said adjustable die plate for adjustably positioning said plate relative to the complementary element on said die block, releasable locking means for restraining said adjustment means to fixedly position said adjustment means and die plate for a predetermined orifice size, said releasable locking means being releasable from restraining relationship to enable said adjustable die plate to be quickly moved from its adjusted position to open the orifice for removing any clogging material therefrom to quickly clear the orifice, and said releasable locking means retaining the adjusted die position for quickly returning and again restraining the adjustable die plate in the adjusted position for continued extrusion, the cooperating cut-off member being positioned downstream from said movable die plate and travelling adjacent to the die plate for cutting off predetermined portions of the extruded material.

5. An adjustable die assembly for foodstuff material according to claim 4 wherein:

said adjustment means comprises a pivoted adjustment lever, one end of which engages said movable die plate.

6. An adjustable die assembly for foodstuff material according to claim 5 wherein:

said releasable locking means comprises a vernier adjustment screw member held in its adjusted position, said vernier adjustment screw member being engageable with said adjustment lever by mechanical interlocking so that movement of the vernier member causes movement of the pivoted adjustment lever to provide fine adjustment of the die plate and corresponding fine adjustment of the orifice size.

7. Extrusion apparatus for extruding foodstuff material comprising an orifice nozzle assembly with a cooperating cut-off member for cutting off the extruded material, said nozzle assembly including:

a die mechanism removably attached to the output end of said nozzle assembly by retaining clamp means, said nozzle having a peripheral mounting plate at its output end, said mounting plate having a surface with at least one raised portion, said raised portion defining an open angle of less than 90° measured relative to the surface of said mounting plate, said die mechanism including an adaptor block, a face of which is adapted to engage said plate surface, said adaptor block having two angular sides defining a dovetail adapted to engage in said open angle so that the adaptor block is held in complementary dovetail relationship when clamped to the nozzle, said retaining clamp means having an angularly shaped portion which complementarily engages the other adaptor block side, to bear thereagainst and securely hold the die mechanism to the nozzle, said cut-off member including a rotary disk and said disk being positioned downstream from the nozzle and adjacent to the die mechanism such that the planes of said mounting plate surface and rotary disk are converging, whereby said die mechanism may be detached from the nozzle assembly by releasing said clamp means and withdrawn parallel to the plate surface without interference with the rotary disk.

8. Extrusion apparatus for foodstuff material according to claim 7 wherein:

said adaptor block has a notch, said plate surface has a locator stud therein adapted to engage in said notch, said notch and stud being complementary so that the two are engaged when the adaptor block face is in contact with the plate surface, thereby preventing lateral displacement of the adaptor block.

9. Extrusion apparatus for foodstuff material according to claim 7 wherein:

said clamp means includes a clamp member which is held in engaging position by a clamp dog for releasing the clamp member permitting the clamp member to move away from said other adapter block side, said clamp dog being movable relative to said die mechanism so that it can either tightly engage or release the clamp member, thereby permitting the clamp member to engage and disengage the said other adapter block side.

10. Extrusion apparatus for foodstuff material according to claim 9, wherein said die assembly further comprises:

nozzle means having a nozzle opening therein, at least one die plate mounted on said nozzle means, said die plate defining together with an opposed element of said nozzle means an extrusion orifice which communicates with said nozzle opening to form an extrusion orifice located at the output end of said nozzle assembly, said die plate being adjustably movable for adjusting the size of theorifice, adjustment means connected to said adjustable die plate for adjustably positioning said plate relative to said complementary element, releasable locking means for restraining said adjustment means to fixedly position said adjustment means and die plate for a predetermined orifice size, said releasable locking means being releasable from restraining relationship to enable said adjustable die plate to be quickly moved from its adjusted position to open the orifice for removing any clogging foodstuff material therefrom to quickly clear the orifice, and said releasable locking means retaining the adjusted die position for quickly returning and restraining the adjustable die plate in the adjusted position for continued extrusion.

11. Extrusion apparatus for extruding foodstuff material and that facilitates access to the extruder interior for quick cleaning, including a housing defining a barrel chamber, a screw within said barrel chamber for extruding foodstuff material through said barrel chamber and power shaft means for applying drive power to one end of said screw, the improvement comprising:

semi-cylindrical upper and lower barrel housings, the upper housing being removably attached to the lower housing by means of a plurality of hand releasable clamps, a removable end plug assembly secured to the downstream end of the housing and having a plurality of bayonet flanges, a plurality of retaining studs on said housing adapted to be cooperatively engaged by said bayonet flanges, a disassembly handle on said end plug assembly for turning said end plug assembly to disengage said flanges from said retaining studs, said end plug assembly including a bearing block having an annular bearing recess to receive the downstream end of a shaft of said screw means, disconnectible clutch means for removably connecting the upstream end of said screw, to said power shaft, whereby the upper housing may be quickly hand removed from the lower housing to permit access to the extruder barrel chamber, and said end plug assembly may be quickly hand disassembled from said housing to permit removal of said extruder screw.

12. Extrusion apparatus for extruding foodstuff material according to claim 11 wherein:

said disconnectible clutch means and said power shaft means include an axial socket defined by one of said means and an axial pilot boss defined by the other adapted to engage in said socket for co-axially centering said clutch means and said power shaft means, said power shaft means having an axial bore, a retaining rod extending through said bore and being releasably secured to said clutch means for holding said clutch means engaged, and a hand knob on the outer end of said retaining rod for manually releasing it from said clutch means.

* * * * *